US006996388B2

(12) United States Patent
Ozeki et al.

(10) Patent No.: US 6,996,388 B2
(45) Date of Patent: Feb. 7, 2006

(54) HIGH-FREQUENCY SIGNAL RECEIVER

(75) Inventors: Hiroaki Ozeki, Osaka (JP); Hitonobu Furukawa, Osaka (JP); Masanori Suzuki, Aichi (JP); Sanae Asayama, Aichi (JP); Masashi Yasuda, Aichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 412 days.

(21) Appl. No.: 10/109,742

(22) Filed: Mar. 28, 2002

(65) Prior Publication Data

US 2002/0160739 A1 Oct. 31, 2002

(30) Foreign Application Priority Data

Mar. 30, 2001 (JP) ............................ 2001-098667

(51) Int. Cl.
*H04B 1/26* (2006.01)

(52) U.S. Cl. ........................ 455/313; 455/130; 455/314

(58) Field of Classification Search ................ 455/313, 455/315–316, 318, 319, 130, 180.2, 188.2, 455/209, 258, 334, 339, 314
See application file for complete search history.

(56) References Cited

U.S. PATENT DOCUMENTS

| | | | | | |
|---|---|---|---|---|---|
| 3,939,429 | A * | 2/1976 | Lohn et al. | ................. | 455/255 |
| 4,799,020 | A * | 1/1989 | English | ................... | 324/76.43 |
| 5,230,094 | A * | 7/1993 | Kitching et al. | ......... | 455/183.2 |
| 5,375,146 | A * | 12/1994 | Chalmers | .................... | 375/350 |
| 5,548,839 | A * | 8/1996 | Caldwell et al. | ............ | 455/313 |
| 5,835,853 | A * | 11/1998 | Enoki et al. | ............. | 455/180.1 |
| 5,909,644 | A * | 6/1999 | Tomiyama | .................. | 455/146 |
| 6,002,924 | A * | 12/1999 | Takano | .................... | 455/161.1 |
| 6,175,325 | B1 * | 1/2001 | Ono | ............................ | 342/20 |
| 6,510,317 | B1 * | 1/2003 | Marko et al. | ............... | 455/428 |
| 6,546,044 | B1 * | 4/2003 | Dent | .......................... | 375/216 |
| 6,625,436 | B1 * | 9/2003 | Tolson et al. | ............... | 455/334 |
| 6,662,001 | B1 * | 12/2003 | Roth | .......................... | 455/314 |
| 2003/0102906 | A1 * | 6/2003 | Ito et al. | ..................... | 329/347 |

* cited by examiner

*Primary Examiner*—Sonny Trinh
(74) *Attorney, Agent, or Firm*—RatnerPrestia

(57) ABSTRACT

A receiver is operable even if including a local oscillator generating a signal at high frequencies but not in a wide frequency range. The receiver includes: a first frequency converter for mixing a received signal with a first local oscillation signal to convert the received signal into respective signals of plural first intermediate frequencies corresponding to a frequency of the received signal; and a second frequency converter for converting the signals of the first intermediate frequencies into a signal of a second intermediate frequency.

5 Claims, 9 Drawing Sheets

First Intermediate Frequency: 1400MHz

Second Intermediate Frequency: 57MHz

Frequency of Received Signal

Frequency of Upper Local Oscillation Signal

Frequency of Lower Local Oscillation Signal

Frequency of Received Signal

Frequency of Upper Local Oscillation Signal

Frequency of Lower Local Oscillation Signal

HIGH-FREQUENCY SIGNAL RECEIVER

FIELD OF THE INVENTION

The present invention relates to a high-frequency signal receiver such as a television receiver.

BACKGROUND OF THE INVENTION

A conventional television receiver for terrestrial broadcasting will be explained. FIG. 6A is a block diagram of the receiver, and FIG. 6B illustrates the relationship between the frequency of a received signal and the oscillation frequency of a first local oscillator.

As shown in FIG. 6A, a signal is received at an input terminal 1, is filtered to a specific range with an input filter 2, and is amplified to a desired level with an amplifier 3. The output of the amplifier 3 is mixed with a signal from a first local oscillator 5 at a first frequency converter 4 to be converted to a signal of 1900 MHz, a target intermediate frequency signal. The output signal of the frequency converter 4 is then filtered with a band-pass filter (BPF) 6, and is mixed with a signal from a second local oscillator 9 at a second frequency converter 8 to be converted to a signal of 57 MHz. The converted signal is filtered with a filter 10 and controlled in gain with an amplifier 11, and is then released from an output terminal 12.

The received signal, upon having a frequency of 90 MHz as shown in FIG. 6B, has the local oscillation frequency of the first local oscillator 5 become 1990 MHz, a sum of 90 MHz and 1900 MHz. Similarly, the received signal, upon having a frequency of 430 MHz, has the local oscillator frequency become 2420 MHz. The received signal, upon having a frequency of 770 MHz, has the local oscillator frequency be 2670 MHz.

The conventional receiver where the received signal to be first converted into a high intermediate frequency includes the first local oscillator generating a signal of wider range, for example, from 1990 MHz to 2670 MHz.

SUMMARY OF THE INVENTION

A receiver is operable even if including a local oscillator generating a signal of neither high frequencies nor wider range of frequencies. The receiver includes: a first frequency converter for mixing a received signal with a first local oscillation signal to convert the received signal into respective signals of plural first intermediate frequencies corresponding to a frequency of the received signal; and a second frequency converter for converting the signals of the first intermediate frequencies into a signal of a second intermediate frequency.

DESCRIPTION OF THE PREFERRED EMBODIMENTS (Embodiment 1)

Figure 1A:
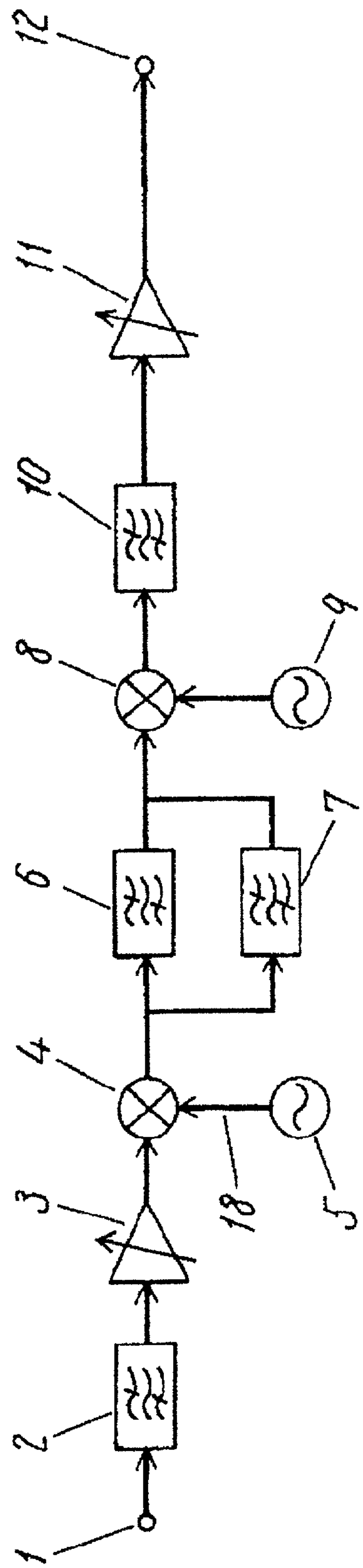
FIG. 1A is a block diagram of a receiver according to Embodiment 1 of the present invention.
Figure 1B:
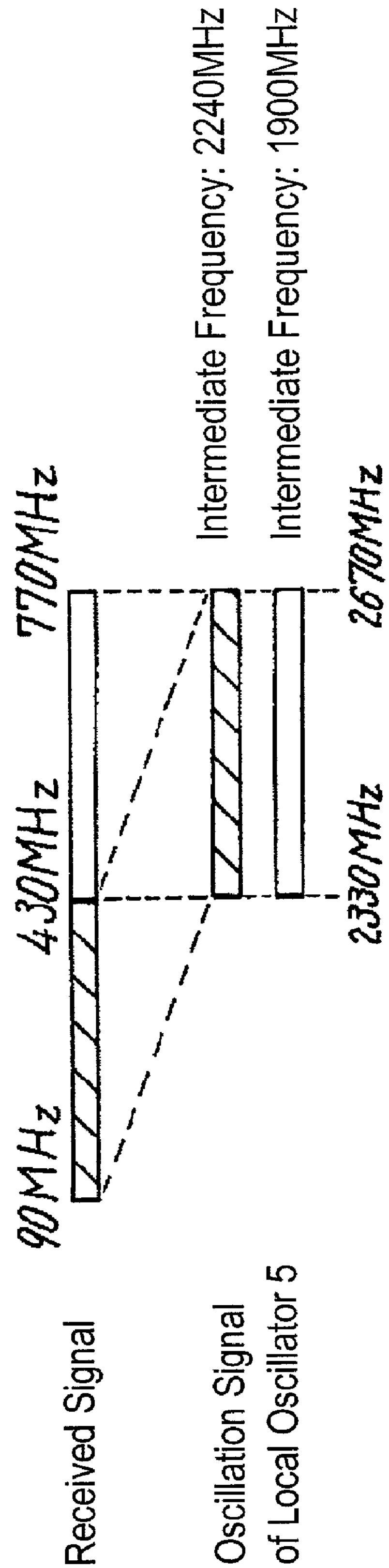
FIG. 1B is an explanatory view showing an operation in the receiver according to Embodiment 1.

FIG. 1A is a block diagram of a receiver according to Embodiment 1 of the present invention. FIG. 1B illustrates a range of frequencies generated by a local oscillator of the receiver.

An operation of a digital signal receiver according to Embodiment 1 will be described referring to FIGS. 1A and 1B. The receiver includes an input terminal 1 for accepting a received signal, a filter 2 connected to the input terminal 1, an amplifier 3 connected to the filter 2, a frequency converter 4 connected to the amplifier 3 for mixing the received signal with a local oscillation signal 18 to provide an intermediate frequency signal, 1900 MHz band-pass filters (BPSs) 6 and 7 connected to the frequency converter 4, a frequency converter 8 for mixing the output of the BPF 6 and 7 with an output signal of a local oscillator 9 to provide an intermediate frequency signal, a filter 10 connected to the frequency converter 8, an amplifier 11 connected to the output of the filter 10, and an output terminal 12 connected to the output of the amplifier 11.

If the frequency of the received signal ranges from 90 MHz to 430 MHz, as shown in FIG. 1B, the first intermediate frequency is 2240 MHz, and thus the oscillator frequency of a local oscillator 5 ranges from 2330 MHz to 2670 MHz. When the frequency of the received signal ranges from 430 MHz to 770 MHz, the intermediate frequency is 1900 MHz, and thus the oscillator frequency of the local oscillator 5 ranges from 2330 MHz to 2670 MHz.

The local oscillator 5 hence generates a range of frequencies from 2330 MHz to 2670 MHz. The received signal at the first intermediate frequency of 2240 MHz passes through the BPF 6 having a center frequency of 2240 MHz and is converted to a second intermediate frequency signal of 57 MHz with the second frequency converter 8. The received signal at the first intermediate frequency of 1900 MHz passes through the BPF 7 having a center frequency of 1900 MHz and is converted to a second intermediate frequency signal of 57 MHz with the second frequency converter 8. The second local frequency oscillator 9 provides a local oscillation signal of 2183 MHz when the first intermediate frequency is 2240 MHz, and the oscillator 9 provides a local oscillation signal of 1843 MHz when the first intermediate frequency is 1900 MHz.

As described, the receiver of Embodiment 1 allows the local oscillator to generate a narrower range of frequencies than that of the conventional receiver, thus requiring a little in the frequency range to the local oscillator.

(Embodiment 2)

Figure 2A:
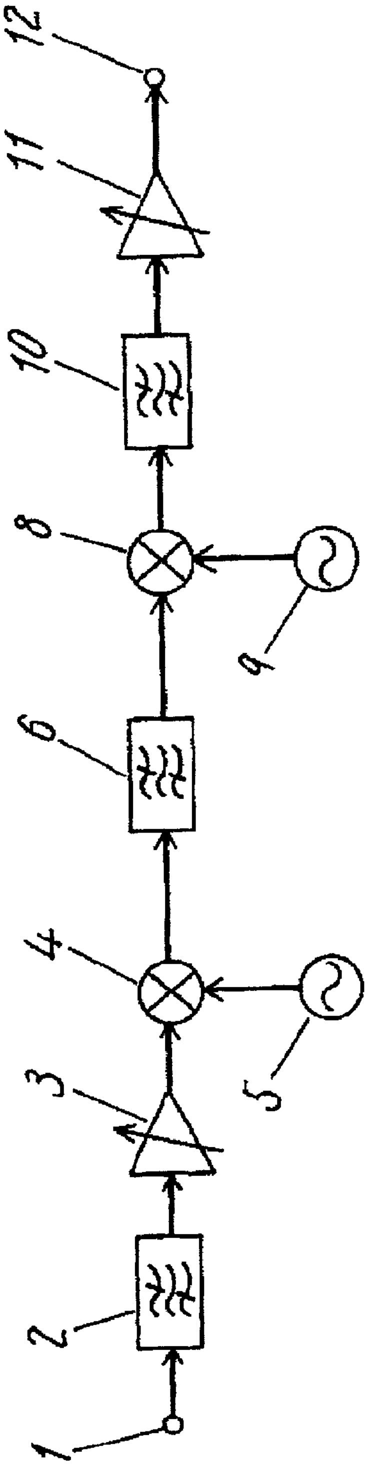
FIG. 2A is a block diagram of a receiver according to Embodiment 2 of the invention.

FIG. 2A is a block diagram of a receiver according to Embodiment 2 of the present invention. FIGS. 2B to 2F are explanatory views showing an operation of the receiver of Embodiment 2. The block diagram of the receiver of Embodiment 2 is substantially identical to that of the conventional receiver except that the intermediate frequency is 1400 MHz of the embodiment, but not 1900 MHz.

Figure 2B:
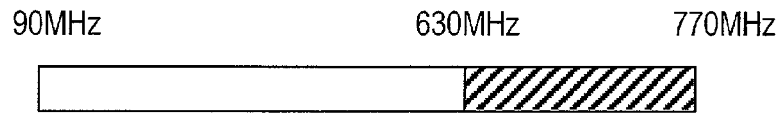
FIGS. 2B to 2G are explanatory views showing an operation in the receiver according to Embodiment 2.
Figure 2C:
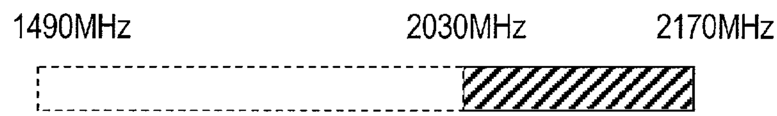

For converting the received frequency ranging from 90 MHz to 770 MHz shown in FIG. 2B into a first intermediate frequency of 1400 MHz, the receiver needs an upper local oscillation frequency ranging from 1490 MHz to 2170 MHz, which is higher than the first intermediate frequency of 1400 MHz as shown in FIG. 2C. For converting the received frequency ranging from 90 MHz to 770 MHz shown in FIG. 2B into the first intermediate frequency of 1400 MHz, the receiver needs a lower local oscillation frequency ranging from 630 MHz to 1310 MHz, which is higher than the first intermediate frequency of 1400 MHz as shown in FIG. 2D.

Figure 2D:
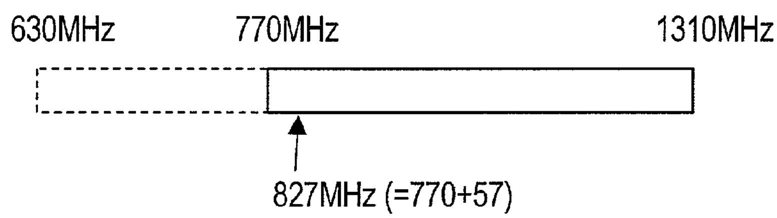

When the local oscillation frequency shown in FIG. 2D is low, a difference between the frequency of a local oscillation signal and a frequency of a signal in the received frequency range may be equal to the second intermediate frequency of 57 MHz. This results in beat interference. For example, when the received signal frequency is 600 MHz, the first local oscillation frequency is to be 800 MHz. Then, a signal of 743 MHz in the received frequency range, since being not attenuated with the filter 2, converted to 57 MHz (=800−743) with the first frequency converter 4. The signal may leak into circuits handling the second intermediate frequency, thus being released as interference from the output terminal 12.

Figure 2E:
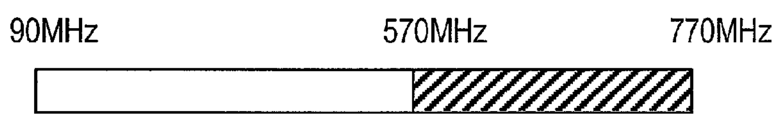
Figure 2F:
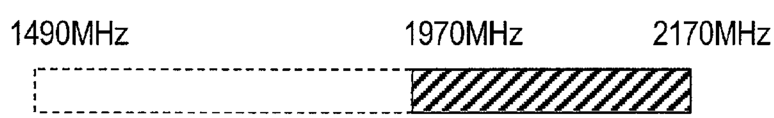
Figure 2G:
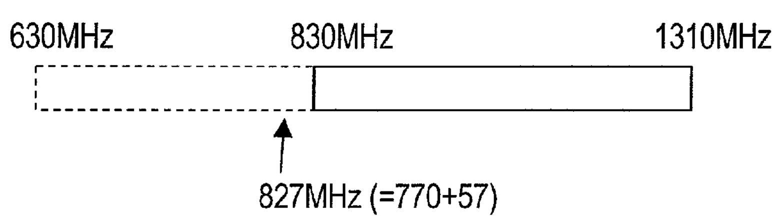

The receiver of Embodiment 2 utilizes both the upper local oscillation and the lower local oscillation to be protected from the interference. FIGS. 2E to 2G illustrate an operation of the receiver of Embodiment 2. For being protected from the interference, the lower local oscillation frequency is higher than a sum of the second intermediate frequency and the uppermost frequency of the received signal range. Thai is, the lowermost of the first local oscillation frequency is to be, for example, 830 MHz as shown in FIG. 2G, which is higher than 827 MHz (the sum of 57 MHz, the second intermediate frequency and 770 MHz, the uppermost frequency of the received signal frequency range).

Thereby, when the receive signal is lower than 570 MHz, the first local oscillation frequency is set equal to the lower local oscillation frequency. And when the receive signal is not lower than 570 MHz, the first local oscillation frequency is set equal to the upper local oscillation frequency as shown in FIG. 2F. That is, the first local frequency ranges from 1970 MHz to 2170 MHz and from 830 MHz to 1310 MHz.

In FIG. 2E, the lowest frequency of the lower local oscillation frequency will be considered. For, example, a received signal of 830 MHz and a signal of 770 MHz in the received frequency range generate a difference of 60 MHz (=829−770), thus do not create a beat signal having a frequency less than 60 MHz. This prevents beat interference from occurring at the second intermediate frequency of 57 MHz.

As described, according to Embodiment 2, the local oscillator is provided more easily than a local oscillator generating a signal only at the upper local oscillation frequency since generates the signal ranging in narrower range at high frequencies.

(Embodiment 3)

Figure 3:
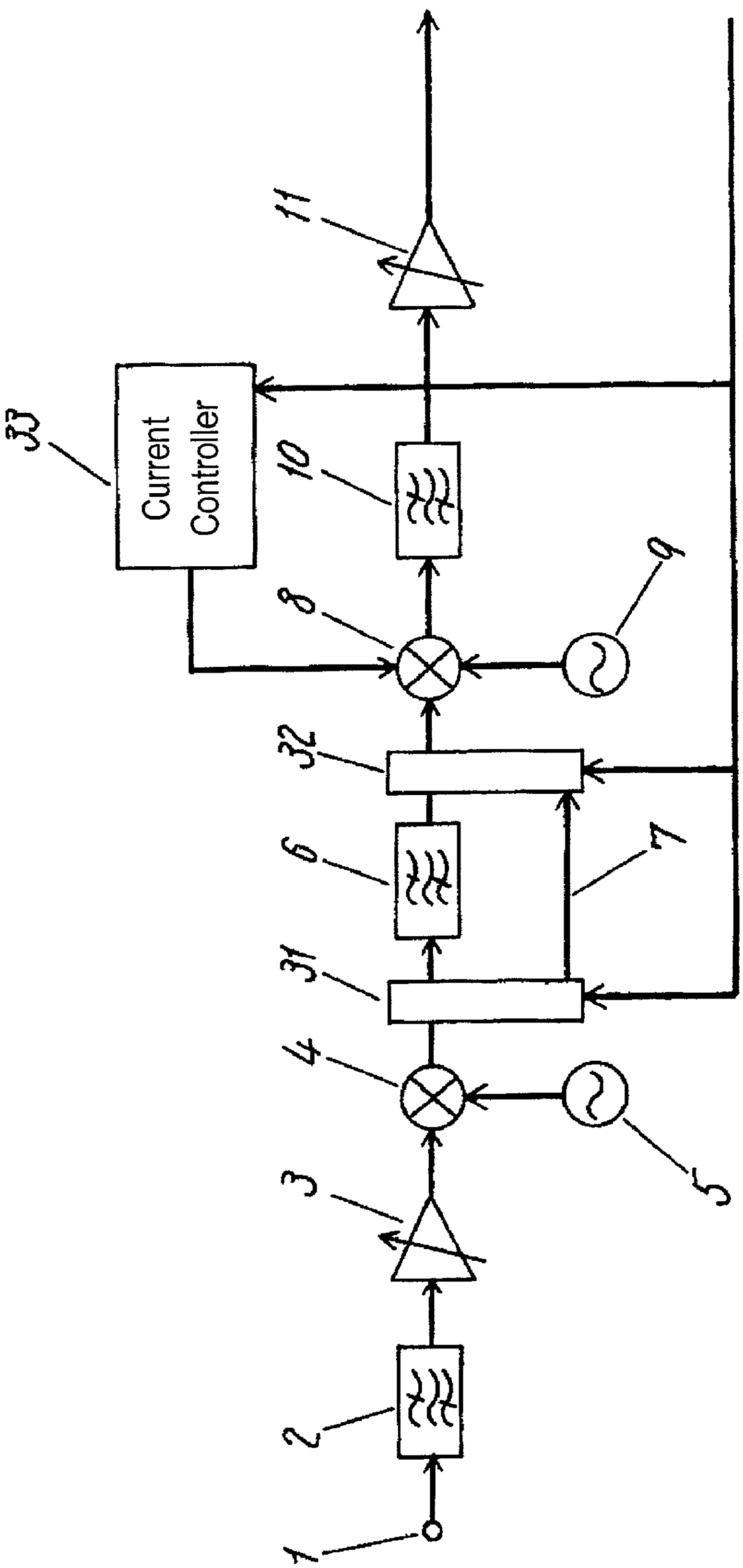
FIG. 3 is a block diagram of a receiver according to Embodiment 3 of the invention.

FIG. 3 is a block diagram of a receiver according to Embodiment 3 of the present invention. When a frequency converter 4 outputs a signal of 1900 MHz and when a local oscillator 9 oscillates a signal of 1843 MHz, a frequency converter 8 outputs a signal of 57 MHz (=1900−1843).

If the signal received by the frequency converter 8 contains an image frequency component of 1786 MHz, the component and the output of the oscillator 9 generate a signal of 57 MHz (=1843−1786) creating interference. To eliminate the interference, a band-pass filter (BPF) 6 is provided for passing only the signal of 1900 MHz. If the image frequency component of 1786 MHz is contained, a route 7 between switching circuits 31 and 32 is selected. When the route 7 is selected, the amplitude of signals becomes greater by a margin lost in the BPF 6. Accordingly, a current controller 33 reduces a current in the frequency converter 8 for decreasing a gain of the frequency converter 8.

As described above, if the image frequency signal component of 1786 MHz is not contained, the current reduced for decreasing the gain results in a lower power consumption of the receiver.

Figure 4A:
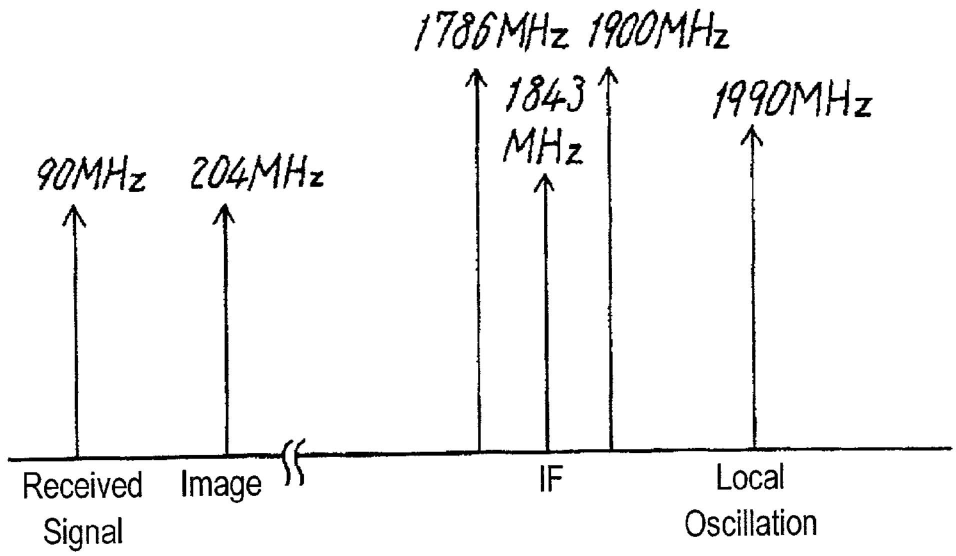
FIG. 4A is an explanatory diagram showing an image signal interference.
Figure 4B:
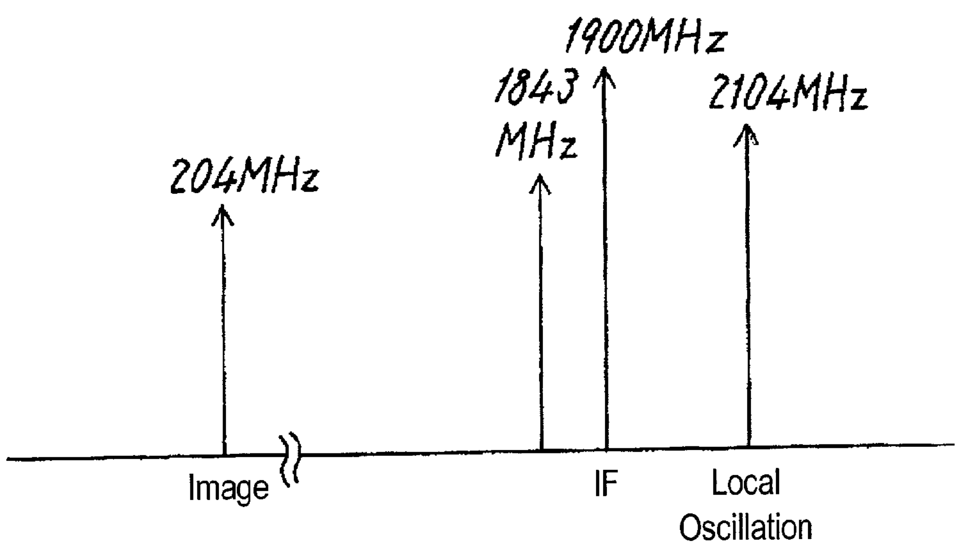
FIG. 4B is an explanatory diagram showing the receipt of an image signal frequency.

FIG. 4A is an explanatory diagram of image interference, and FIG. 4B is an explanatory diagram showing an operation of the receiver receiving a signal of the image frequency. The frequency converter 4 mixes the received signal of 90 MHz and a local oscillation signal of 1990 MHz to generate an intermediate frequency signal of 1900 MHz. The intermediate frequency signal at 1900 MHz is then mixed with another local oscillation signal of 1843 MHz to generate an output signal of 57 MHz. A signal of 204 MHz, if existing, is converted to a signal of 1786 MHz with the frequency converter 4 and then converted to a signal of 57 MHz with the frequency converter 8, thus creating image interference.

The frequency of the local oscillator, upon being 2140 MHz, converts an image frequency signal of 204 MHz to a signal of 1900 MHz as shown in FIG. 4B. Accordingly, the presence of the image frequency signal can be recognized through detecting a level of the signal, thus determining whether the filter is activated or not.

(Embodiment 4)

Figure 5:
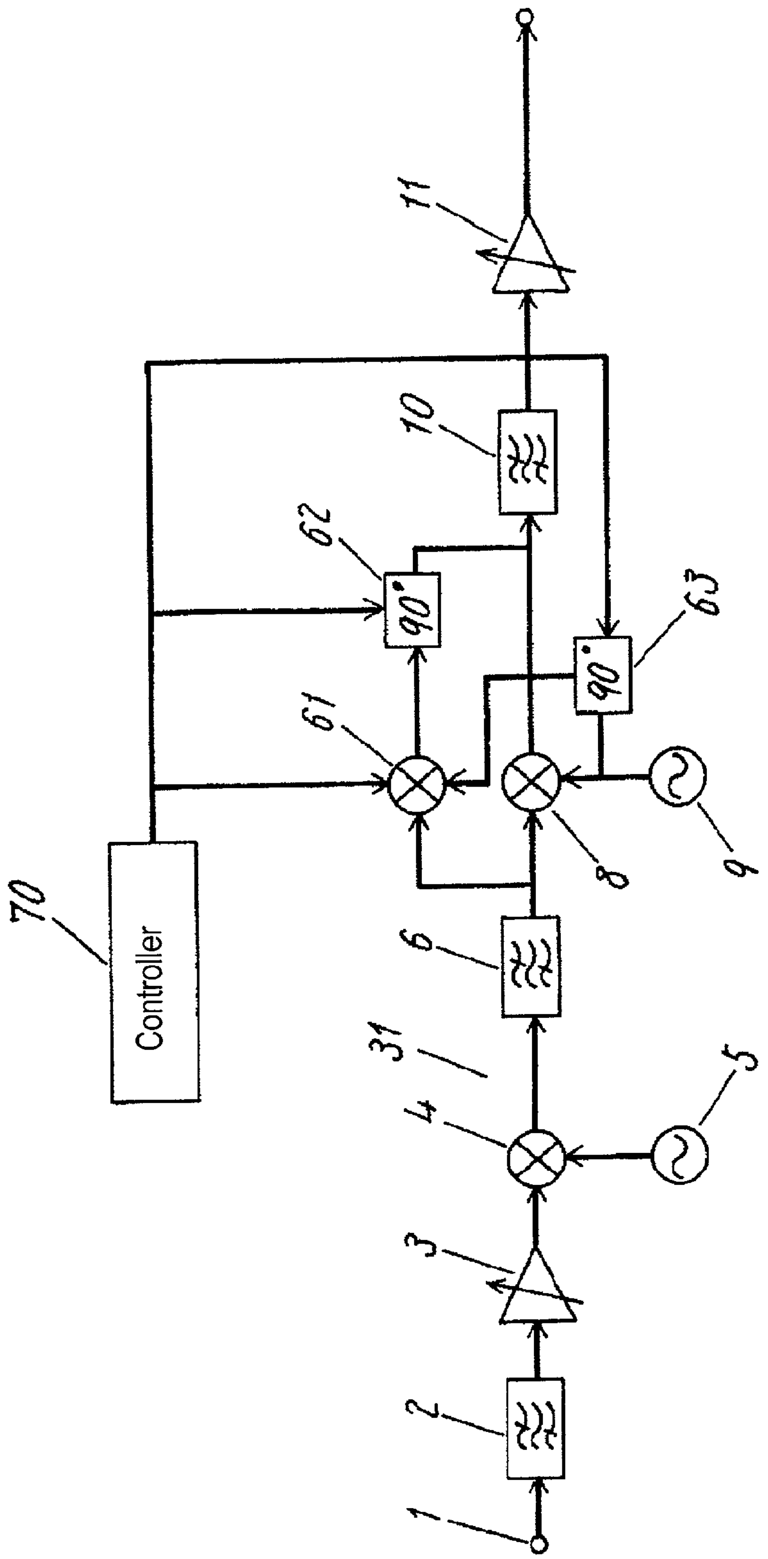
FIG. 5 is a block diagram of a receiver according to Embodiment 4 of the invention.
Figure 6A:
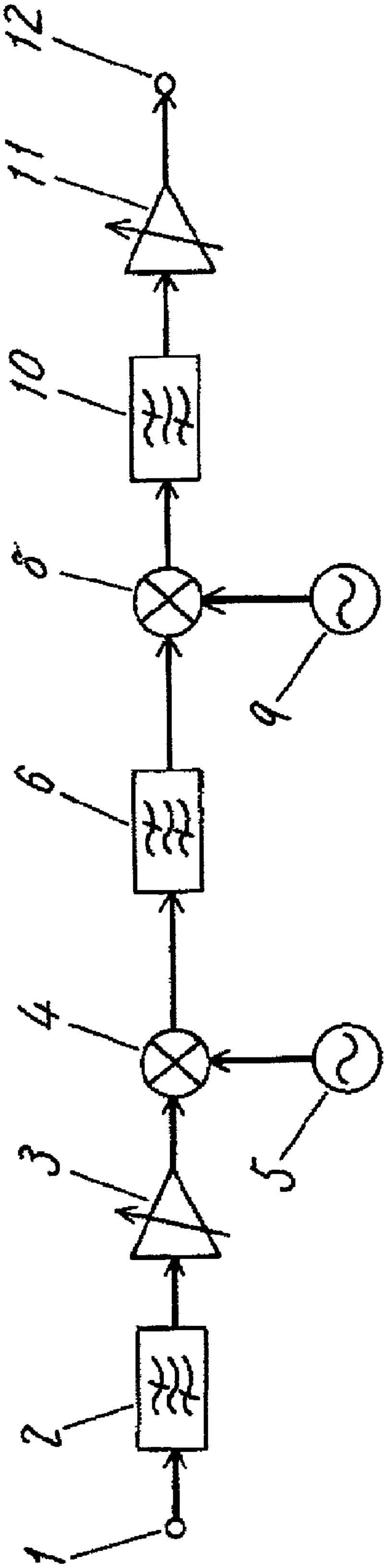
FIG. 6A is a block diagram of a conventional receiver.
Figure 6B:
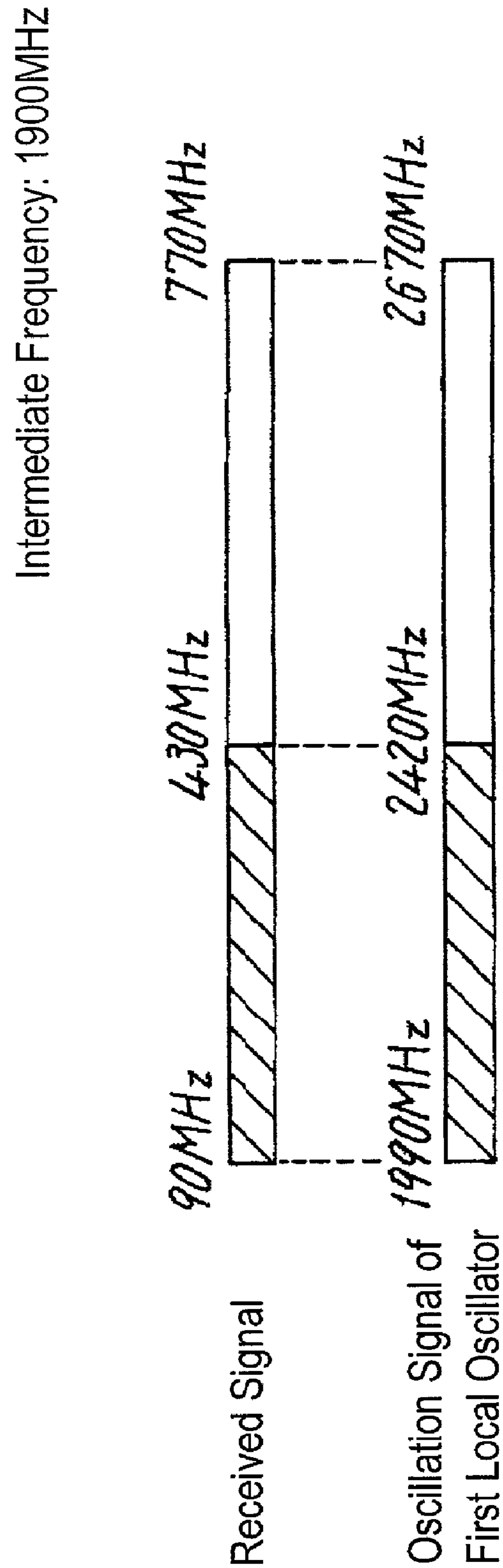
FIG. 6B is an explanatory view showing an operation in the conventional receiver.

FIG. 5 is a block diagram of a receiver according to Embodiment 4 of the present invention. The receiver of Embodiment 4 includes frequency converters 61, 8 and 90-degree phase shifters 62, 63. The four components compose a frequency converter of image rejection type (cf. "The Design of CMOS Radio Frequency Integrated Circuits", page 557, by Thomas H. Lee, Cambridge University Press). An image rejection type mixer does not converts an image signal into an intermediate frequency signal, thus being not affected by the image signal. When the image signal does not exist, a controller 70 does not energizes the frequency converter 61 or the 90-degree phase shifters 62, 63. This allows the frequency converter 8 to perform an ordinary frequency conversion thus reduces a current consumption of the receiver.

Accordingly, the receiver does not energize particular circuits therein when the image frequency signal does not exist, hence having a low power consumption.

As set forth above, in the receiver according to the present invention, the first intermediate frequencies correspond to different frequencies of the received signal for a single local oscillator frequency, respectively. This allows the local oscillator to generate a signal in a narrow range of oscillation frequencies. The oscillator is accordingly provided easily, and thus is effective for the receiver receiving a signal in a wide frequency range.

What is claimed is:

1. A receiver comprising:

a first frequency converter for mixing a received signal with a first local oscillation signal to convert the received signal into respective signals of a plurality of first intermediate frequencies corresponding to a frequency of the received signal, the plurality of first intermediate frequencies being different from each other; and a second frequency converter for converting the signals of the first intermediate frequencies into a signal of a second intermediate frequency and for converting another of the signals of the first intermediate frequencies into another signal of the second intermediate frequency.

2. A receiver comprising:

a first frequency converter for mixing a received signal with a first local oscillation signal to convert the received signal into a signal of a first intermediate frequency; and a second frequency converter for converting the signal of the first intermediate frequency into a signal of a second intermediate frequency, wherein the first frequency converter sets a frequency of the first local oscillation signal to one of an upper local oscillation frequency which is higher than the first intermediate frequency and a lower local oscillation frequency which is lower than the first intermediate frequency, and wherein a lowest limit of a range of the first local oscillator frequency is higher than a sum of the second intermediate frequency and a highest limit of a frequency range of the received signal.

3. A receiver apparatus comprising:

a first frequency converter for mixing a received signal with a first local oscillation signal to convert the received signal into a signal of a first intermediate frequency;

a second frequency converter for converting the signal of the first intermediate frequency into a signal of a second intermediate frequency;

a filter coupled between the first and second frequency converter for passing the signal of the first intermediate frequency; and a switching circuit for deactivating the filter except when an output signal of the first frequency converter contains an interference signal of an image frequency for the second frequency converter.

4. A receiver according to claim 3, wherein the switching circuit determines whether the output signal of the first frequency converter contains the interference signal of the image frequency or not according to a status whether or not the received signal contains a signal of which frequency corresponding to the image frequency.

5. A receiver apparatus comprising:

a first frequency converter for mixing a received signal with a first local oscillation signal to convert the received signal into a signal of a first intermediate frequency;

a second frequency converter including an image rejection type mixer for converting the signal of the first intermediate frequency into a signal of a second intermediate frequency; and a controller for activating a part of the image rejection type mixer when an output signal of the first frequency converter does not contain a signal of an image frequency for the second frequency converter.

* * * * *